March 6, 1934.  G. WEBB  1,949,438
CLEANING AND ANNEALING MACHINE
Filed Dec. 2, 1930  3 Sheets-Sheet 1
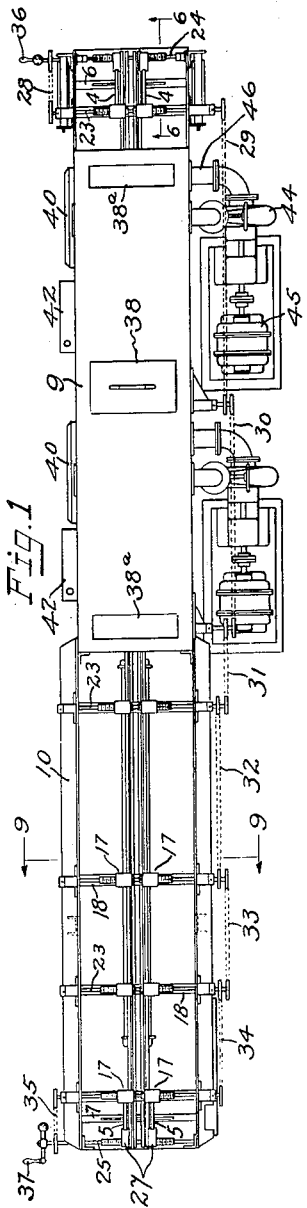
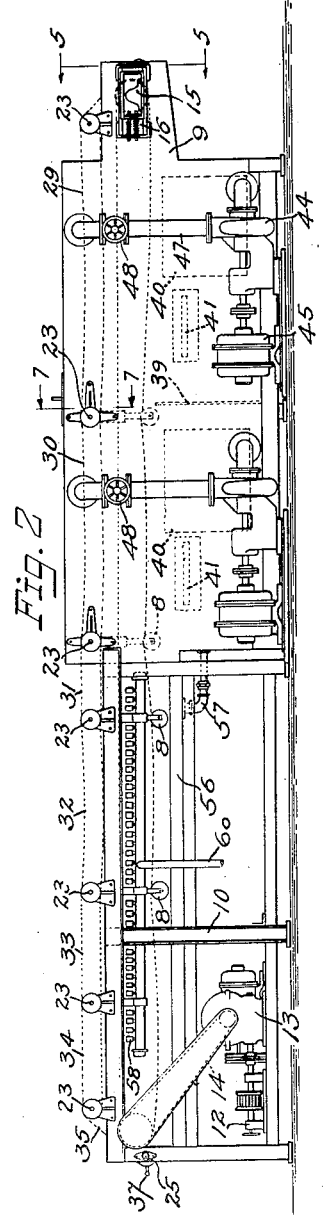
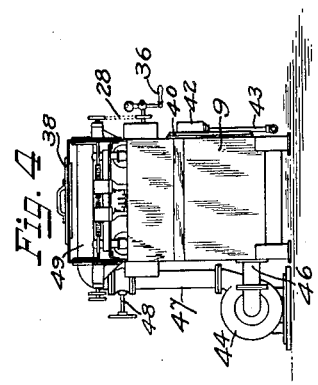
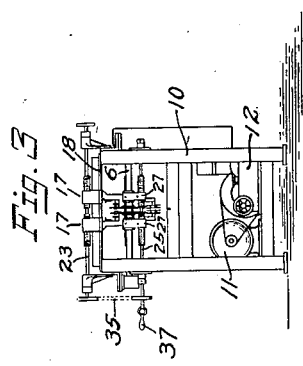
Inventor.
George Webb.
By S. Jay Teller
Attorney.

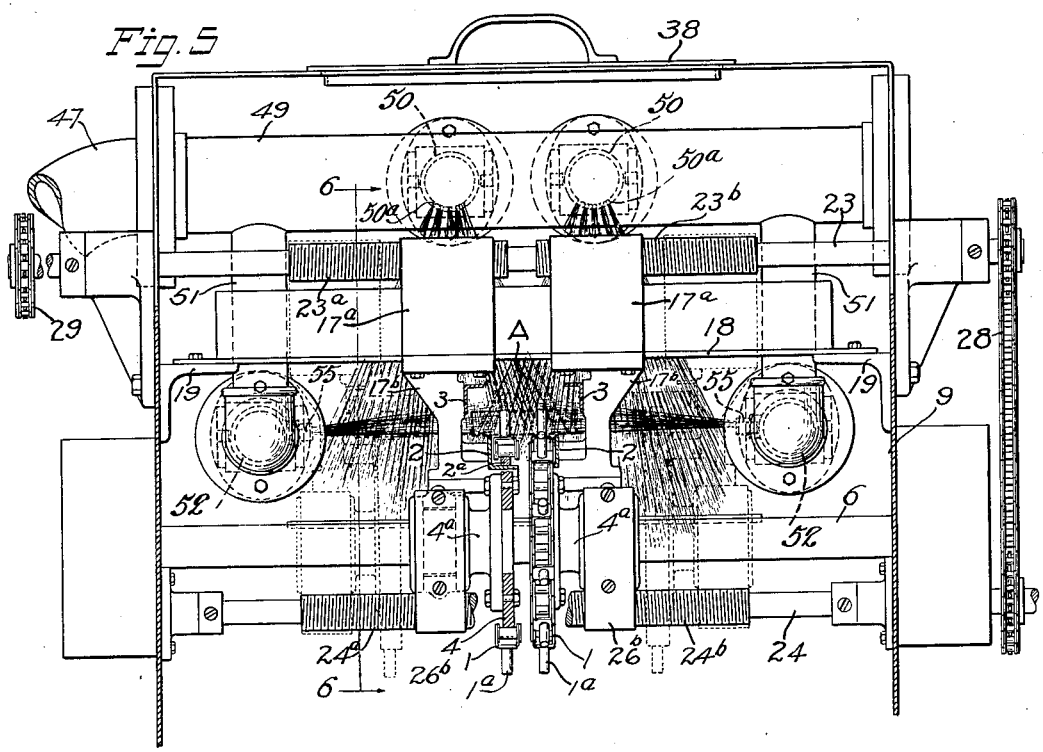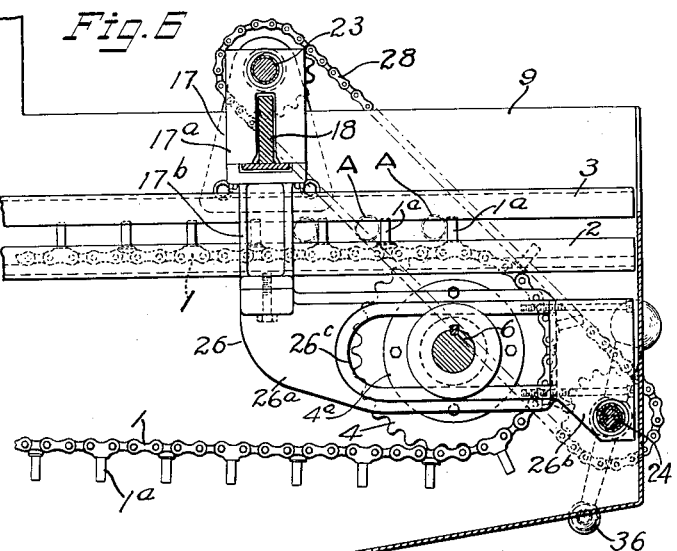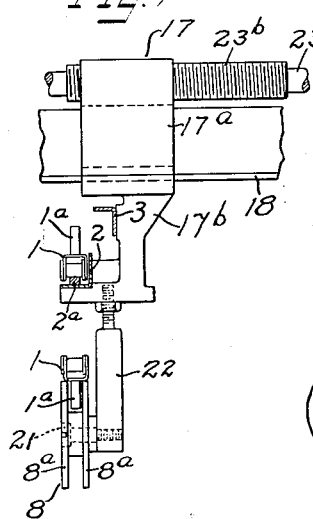

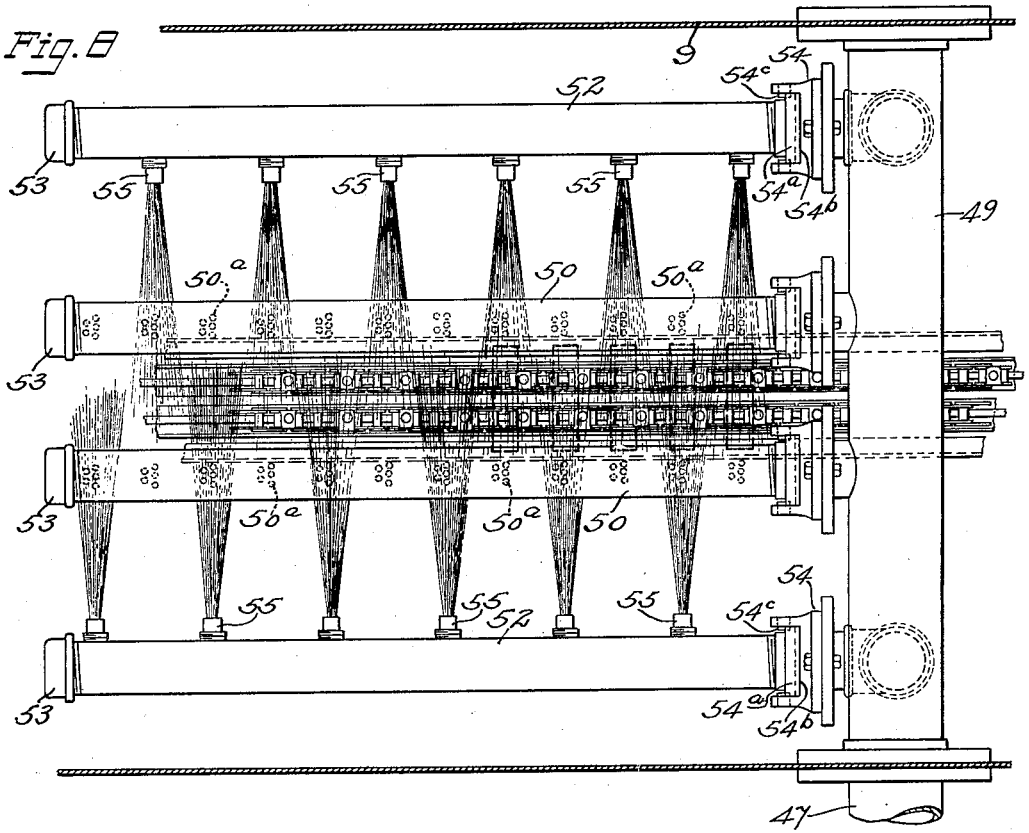
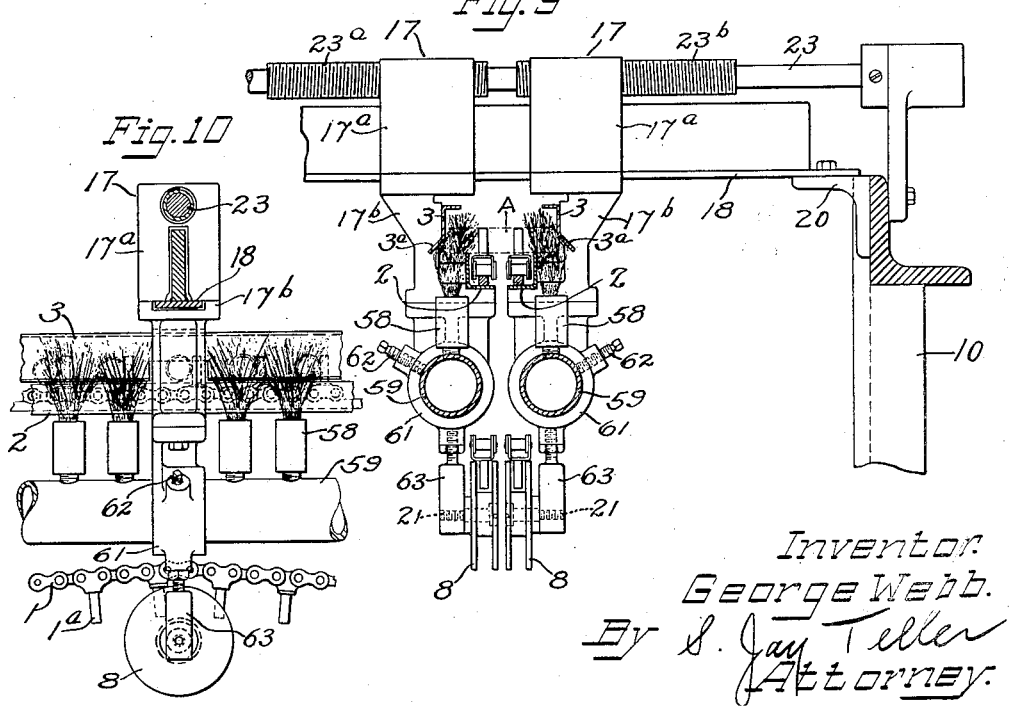

Patented Mar. 6, 1934

1,949,438

UNITED STATES PATENT OFFICE 1,949,438

CLEANING AND ANNEALING MACHINE

George Webb, West Hartford, Conn., assignor to Colt's Patent Fire Arms Manufacturing Co., Hartford, Conn., a corporation of Connecticut Application December 2, 1930, Serial No. 499,543

20 Claims. (Cl. 266—4)

The general object of the present invention is to provide a simple and efficient machine adapted for the treatment of small articles during an intermediate stage of the manufacture thereof, which articles may be formed of metal, glass or other material. A machine embodying the invention is particularly adapted for first washing or cleaning the articles and for then heating them to effect annealing, such cleaning and heating being effected during a single movement of the articles through the machine without any intermediate handling thereof.

A more specific object of the invention is to provide an improved mechanism for moving the articles through the machine and for changing the positions thereof as they are moved, in order that they may be more effectively acted upon by the cleaning devices or by the heating devices.

Another specific object of the invention is to provide means for guiding and moving the articles through the machine, which means is readily adjustable to accommodate articles of different sizes or lengths.

Still other more specific objects of the invention will be apparent from the following specification and claims.

In the accompanying drawings I have shown the embodiment of the invention which I now deem preferable, but it will be understood that the drawings are intended for illustrative purposes only and are not to be construed as defining or limiting the scope of the invention, the claims forming a part of this specification being relied upon for that purpose.

Of the drawings:

Fig. 1 is a plan view of a machine embodying the invention.

Fig. 2 is a side view.

Fig. 3 is a left end view.

Fig. 4 is a right end view.

Fig. 5 is an enlarged fragmentary transverse sectional view taken along the line 5—5 of Fig. 2.

Fig. 6 is an enlarged fragmentary longitudinal view taken along the lines 6—6 of Figs. 1 and 5.

Fig. 7 is an enlarged fragmentary transverse sectional view taken along the line 7—7 of Fig. 2.

Fig. 8 is an enlarged fragmentary plan view showing the spray pipes near the right or entrance end of the machine, the top of the casing being omitted.

Fig. 9 is an enlarged fragmentary transverse sectional view taken along the line 9—9 of Fig. 1.

Fig. 10 is a fragmentary side view of the parts shown in Fig. 9.

So far as concerns the broader aspects of my invention I do not limit myself as concerns the particular character of the articles to be handled and treated; but in order that the invention may be clearly understood and in order that certain more specific features thereof may be explained, I have shown and will describe a machine adapted for handling and treating small cylindrical articles which are preferably hollow. The articles may be assumed to be formed of metal, although this is not essential.

The hollow cylindrical articles to be treated are moved through the machine in spaced relationship and with their axes extending transversely of the direction of movement. At least one endless chain is provided for engaging the articles to maintain them in spaced relationship and to move them, and preferably there are two such chains arranged in parallelism and traveling in unison. In addition to the chain or chains there are preferably also provided two parallel longitudinal rails for supporting the articles.

The two parallel endless chains are shown in the drawings at 1, 1 and the two parallel rails are shown in the drawings at 2, 2. The articles to be handled and treated are indicated at A, A. It will be evident that the said articles are supported on the rails 2, 2 and are positioned transversely thereof. The chains 1, 1 are provided with pins $1^a$, $1^a$ which project upward above the level of the tops of the rails 2, 2 and engage the said articles A, A to properly space them and to move them longitudinally along the rails. If desired additional rails 3, 3 may be provided to maintain the articles in proper relationship to the chains 1, 1 and to the rails 2, 2. These rails 3, 3 are parallel to the rails 2, 2 and are preferably so positioned as to engage the articles A, A only near the top edges thereof.

The chains 1, 1 pass over sprocket wheels 4, 4 and 5, 5 located respectively at the right and left ends of the machine. The sprocket wheels 4, 4 are mounted on a transverse shaft 6, and the sprocket wheels 5, 5 are mounted on a transverse shaft 7. As shown most clearly in Fig. 5, each sprocket wheel is carried by a hub such as $4^a$ which is splined to the corresponding shaft.

Preferably the rails 2, 2 are angle bars, so arranged that the articles A, A rest upon the top edges of the vertical legs thereof. The horizontal legs of the angle bars carry bars $2^a$ which serve to support the upper strands of the chains 1, 1. The lower strands of the chains are supported upon idler pulleys 8, 8, one of which is clearly shown in Fig. 7. Each idler pulley comprises two discs $8^a$, $8^a$, so spaced that the pins $1^a$, $1^a$ can pass between them as shown.

For supporting the various movable parts of the machine there is provided a suitable framework which may be widely varied in its details of construction in order to suit the particular requirements for which the machine is designed. In the present instance the machine is adapted for washing and heating the articles, and therefore the framework comprises two differently constructed parts. Adjacent the entrance end of the machine the framework comprises a tank 9 adapted to contain cleaning liquids, and adjacent the exit end of the machine there is provided an open framework 10 comprising vertical, transverse and longitudinal structural steel members. The open framework 10 is connected with the tank 9 so as to form a single unitary structure.

The transverse shaft 7 carrying the sprocket wheels 5, 5 is supported in suitable bearings and carried by the framework 10 and the said framework also carries a drive motor 11. This motor is connected with the shaft 6 by means of a change-speed mechanism 12, a speed reducing mechanism 13 and a transmission chain 14. Thus the chains 1, 1 are operated to move the articles A, A from right to left through the machine. The transverse shaft 6 carrying the sprocket wheels 4, 4 is mounted in suitable bearings 15 carried by the tank 9 near the right end thereof. The said bearings 15 are preferably longitudinally movable under the influence of springs 16 in order to maintain the proper tension in the chains 1, 1.

When the chains are in operation the articles A, A to be handled and treated are fed to the machine at the right hand end thereof, this feeding being effected manually or by means of some suitable automatic feeding mechanism. The articles are successively engaged by the several pins 1$^a$, 1$^a$ of the chains, and they are then carried in spaced relationship longitudinally along the rails 2, 2 being guided by the rails 3, 3. When the articles are cylindrical as is shown in the drawings, they are given a rolling motion as they pass through the machine, this rolling motion being highly advantageous in effecting a uniform washing, heating or other treatment of the said articles. The positions of the rails 3, 3 are such that the major portions of the ends of the articles are left exposed.

In order that the machine may be adapted for treating articles of different sizes, particularly of different lengths, provision is preferably made for transversely adjusting the several parts which engage the said articles. When two separate chains 1, 1 are provided, provision is made for changing the spacing of the chains, and when rails 2, 2 and 3, 3 are provided, provision is made for changing the spacing of the rails. In fact it is preferred to move both the chains and the rails and to move them in unison. For supporting the idler pulleys 8, 8, and the rails 2, 2 and 3, 3 and also for supporting other parts to be presently described, there are provided several pairs of brackets 17, 17 which are movable transversely on rails 18, 18 extending from side to side of the machine. As shown in Fig. 5 the rails 18 at the right portion of the machine are carried by brackets 19 projecting inward from the side walls of the tank 9; and as shown in Fig. 9 the rails 18 at the left hand end of the machine are carried by brackets 20 projecting inward from the structural steel framework 10. As shown most clearly in Figs. 6 and 10, each of the rails 18 is in the shape of an inverted T and each of the brackets 17 is made in two parts 17$^a$ and 17$^b$ which are shaped to provide a T-shaped opening approximately fitting the rail 18. Thus each of the brackets 17 is supported and guided for movement transversely of the machine.

The rails 2, 2 and 3, 3 are directly connected to the lower parts 17$^b$, 17$^b$ of the several brackets 17, 17. Each of the idler pulleys 8 is rotatable on a stud 21 carried by a bracket 22, which in turn is connected with the lower part 17$^b$ of the corresponding bracket 17.

Extending transversely across the machine immediately above each of the rails 18 and supported by suitable bearings is a rotatable shaft 23, and similar shafts 24 and 25 extend transversely of the machine adjacent the respective shafts 6 and 7. Each of the shafts 23 is provided with oppositely threaded portions 23$^a$, 23$^b$ which extend through similarly threaded openings in the upper parts 17$^a$, 17$^a$ of the corresponding brackets 17, 17. Connected with the bracket parts 17$^b$, 17$^b$ at the right end of the machine are two brackets 26, 26 which extend toward the right. Each of the brackets 26 is formed with two parts 26$^a$ and 26$^b$ connected together by screws. The outer parts 26$^b$, 26$^b$ of the two brackets are provided with oppositely threaded openings through which extend the oppositely threaded portions 24$^a$, 24$^b$ of the shaft 24. The inner parts 26$^a$, 26$^a$ of the brackets 26 are provided with longitudinal slots 26$^c$ through which extend the annularly grooved portions of the hub 4$^a$, 4$^a$ connected with the sprocket wheels 4, 4. It will be apparent that the grooves 26$^c$ permit the adjustment of the shaft 6 and of the sprocket wheels 4, 4 longitudinally of the machine to tighten the chain as already described. Similarly the brackets 17, 17 at the left hand end of the machine have connected with them castings 27, 27 which have threaded apertures adapted to engage the oppositely threaded portions of the shaft 25. The construction at the left end of the machine is similar to that at the right end of the machine, with the exception that the elongated slots 26$^c$ are omitted as there is no provision for longitudinal adjustment of the shaft 7.

The several transverse oppositely threaded shafts 23, 23, 24 and 25 are mechanically connected together so that all of them can be turned in unison. As shown the several threaded shafts are provided with sprocket wheels at their ends and these sprocket wheels are engaged by a series of chains 28, 29, 30, 31, 32, 33, 34 and 35. By means of this series of chains all of the threaded shafts may be turned in unison in either direction. The means for turning the shafts may be varied but I have shown for this purpose cranked handles 36 and 37 mounted respectively on the shafts 24 and 25.

By turning the two cranked handles 36 and 37 the several threaded shafts can be rotated in either direction so as to change the spacing between the brackets 17, 17 of each of the several pairs. By thus moving the brackets the rails 2, 2 and 3, 3 and the chains 1, 1 can be moved toward or away from each other, thus adapting the machine for handling articles A, A of different lengths. It will be observed that the movements of the several parts are equalized with respect to the longitudinal vertical central plane of the machine, the parts at opposite sides of the said plane moving uniformly in opposite directions. When adjusted in the manner described the several parts are maintained in symmetrical relationship to the fixed central vertical plane.

The features of construction that have been described can be incorporated in machines adapted for a variety of purposes, and so far as the broader aspects of the invention are concerned I do not limit myself to a machine for any one purpose. However the mechanism described is particularly well suited for use in a machine adapted for first washing or cleaning the articles and for then heating them to effect annealing, and such a machine has therefore been shown in the drawings and will now be described in detail.

As already stated the framework of the machine at the right portion thereof consists of a sheet metal tank 9 adapted to contain cleaning liquids. The tank is provided with a sheet metal cover 38 which may be removable if desired and this cover is preferably provided with openings 38ª, 38ª for the escape of steam and vapor. The tank may be divided into a plurality of compartments so as to contain a plurality of different cleaning liquids, but I do not limit myself as to the exact number of compartments. As shown there is provided a single transverse partition 39 which divides the tank 9 into two compartments. Associated with each of the compartments are elements and mechanism for the control of the cleaning liquid and such elements and mechanism will now be described, it being understood that the said parts used in association with one of the compartments may be duplicated for the other.

For each compartment of the tank 9 there is provided a door 40 which is normally closed but which can be opened to provide access to the interior of the compartment for cleaning purposes. Each compartment of the tank 9 may contain cleaning liquid up to the level of the overflow opening 41, which opening extends into a box 42 connected with a discharge pipe 43. Mounted on a suitable platform at the front of the machine is a centrifugal pump 44 driven by an electric motor 45. The pump 44 has its inlet connected by means of a pipe 46 with the lower part of the corresponding compartment of the tank 9 and the said pump has its outlet connected by means of a pipe 47 with spray devices in the upper part of the tank. A valve 48 may be provided for controlling the flow of liquids through the pipe 47.

The pipe 47 connects with a manifold 49 extending transversely of the tank 9 near the top thereof. Connected with the manifold 49 above the level of the rails 2, 2 are longitudinal spray pipes 50, 50. Depending from the manifold 49 are connecting pipes 51, 51 which are connected at their lower ends with longitudinal spray pipes 52, 52 located near the sides of the tank 9 and at approximately the level of the articles being moved through the machine. The projecting ends of the pipes 50, 50 and 52, 52 are closed by plugs 53, 53. The said pipes are connected with the manifold 49 and with the connecting pipes 51, 51 by a detachable connection means 54, 54, such as that disclosed in my patent for Dish washing machine, No. 1,762,847 issued June 10, 1930. Each of the pipes is provided with a wedge shaped flange 54ª having an outer contact surface which is adapted to engage a corresponding surface 54ᵇ on the supporting member, that is, on the manifold 49 or on the connecting pipe 51. Carried by the supporting member are pins 54ᶜ and the wedge shaped flange 54ª fits between the said surface 54ᵇ and the said pins 54ᶜ, thus making a liquid tight connection between the spray pipe and the supporting member therefor. It will be evident however that by raising the spray pipe it can be readily disconnected.

Each of the upper spray pipes 50, 50 is provided with a series of separate apertures 50ª, 50ª in the lower portion thereof, and the result is that when the pump 44 is operated liquid is withdrawn from the corresponding compartment and is delivered under pressure through the apertures 50ª, 50ª against the articles being moved by the chains. Inasmuch as these articles are being rotated as they are moved, it will be apparent that all portions of the outer surface thereof are engaged by the sprays delivered through the orifices 50ª, 50ª.

Each of the spray pipes 52, 52 is provided with a series of spaced spray nozzles 55, 55. Each of the nozzles 55 is so designed as to deliver a relatively concentrated jet of the cleaning liquid against the articles being moved by the chains. When the articles are hollow and open at both ends, the jets delivered from the nozzles 55, 55 will enter the articles and thus clean the interiors thereof. In order that the jets operating from opposite sides of the machine may not interfere with each other they are preferably staggered as clearly shown in Fig. 8. From this view it will be apparent that each article A as it is moved along will be acted upon alternately by jets coming from opposite ends thereof, one jet passing through the article in one direction and the next jet passing through the article in the other direction. In this way I not only avoid any interference between the oppositely directed jets, but I also effect a more thorough cleaning by subjecting the articles to liquids moving first in one direction and then in the other.

At the left portion of the machine there is preferably provided a pan 56 for catching any liquid that may drip from the chains 1, 1 or from the articles A, A. This pan is connected with a pipe 57 which carries the liquid back into the tank 9.

After the articles have passed through the tank 9 and have been subjected to the cleaning operation that has been described, they are then subjected to a heating or annealing operation which takes place at the left portion of the machine. Two heating devices are provided for heating the projecting end portions of the articles A, A. Preferably and as shown these heating devices are located below the level of the said articles and each of the said devices comprises a series of gas burners 58, 58 connected with a manifold 59. Gas may be supplied to each manifold 59 through a flexible supply pipe 60. As shown most clearly in Fig. 9 the two heating devices are so located that the burners 58, 58 thereof are vertically beneath the projecting end portions of the articles A which are being treated. The said gas burners 58, 58 may be regarded as constituting devices for directing jets of fluid, that is, burning gases, against the articles A, A, as they are moved.

In order that the hot gases from the burners or jet devices 58, 58 may pass into the interiors of the articles to more effectively heat them, the rails 3, 3 at this portion of the machine are provided with inclined extensions 3ª, 3ª which serve as baffles to guide the gases into the articles. The rolling motion of the articles A insures a uniform heating thereof. After the articles have been subjected to the action of the heating devices which have been described they are then allowed to cool to effect annealing. A certain amount of cooling takes place while the articles are still engaged by the chains 1, 1, and further cooling takes place after the articles have been discharged from the chains into a suitable receptacle or into a suitable conveyor.

When provision is made for adjusting the machine to accommodate articles of different lengths, the heating or jet devices 58, 58 are also movable for the same purpose. Preferably therefore the heating or jet devices are carried by the same brackets 17, 17 which carry the chains 1, 1 and the rails 2, 2 and 3, 3. As shown each lower bracket portion 17$^b$ at the left or heating portion of the machine, has secured to it a bracket 61 provided with a longitudinal hole through which the manifold 59 extends. The manifold is held in place by means of set screws 62. The idler pulleys at this portion of the machine are carried by brackets 63 similar to the brackets 22 but differing somewhat in proportion. These brackets 63 are connected to the bottoms of the brackets 59. It will be apparent that when the brackets 17, 17 and other parts are adjusted as already described to move the chains 1, 1 and the rails 2, 2 and 3, 3 the heating devices will be correspondingly moved thus maintaining the burners or jet devices 58, 58 directly under the end portions of the articles A, A.

What I claim is:

1. The combination of two parallel spaced angle bar rails each having its two legs respectively positioned vertically and horizontally with the vertical leg projecting upward from the horizontal leg so that the top edges of the two vertical legs may support a series of transversely extending articles, two endless chains having portions thereof supported by the horizontal legs of the said rails below the level of the said top edges of the vertical legs, spaced projections on the chain adapted to engage articles supported as aforesaid so as to move them longitudinally of the rails, and devices adjacent the rails for subjecting the moving articles to an operative treatment.

2. The combination of two parallel spaced angle bar rails each having its two legs respectively positioned vertically and horizontally with the vertical leg projecting upward from the horizontal leg so that the top edges of the two vertical legs may support a series of transversely extending articles, two endless chains having portions thereof supported by the horizontal legs of the said rails below the level of the said top edges of the vertical legs, spaced projections on the chain adapted to engage articles supported as aforesaid so as to move them longitudinally of the rails, additional rails parallel to the said angle bar rails for preventing transverse movement of the articles, and devices adjacent the rails for subjecting the moving articles to an operative treatment.

3. The combination of two parallel endless chains provided with projections thereon adapted to engage and move articles to be treated, two longitudinal series of devices parallel to and adjacent the article engaging portions of the said chains for directing jets of fluid against the articles as they are moved, and means for changing the spacing of the chains while maintaining them in parallelism and for changing the spacing of the two series of jet devices so as to adapt the said chains and jet devices for articles of different sizes.

4. The combination of two parallel endless chains provided with projections thereon adapted to engage and move articles to be treated, two longitudinal series of devices parallel to and adjacent the article engaging portions of the said chains for directing jets of fluid against the articles as they are moved, and means for moving the two chains and the two series of jet devices uniformly in opposite directions so as to adapt the said chains and jet devices for articles of different sizes and so as to nevertheless maintain the said chains and jet devices in symmetrical relationship to a fixed central plane.

5. The combination of two parallel rails constituting a track for supporting a series of articles to be treated, two endless chains having portions thereof movable in paths parallel to and adjacent the said track and provided with projections thereon adapted to engage the said articles to move them along the track, two longitudinal series of devices adjacent the track at opposite sides thereof for directing jets of fluid against the articles as they are moved, and means for changing the spacing of the rails and of the chains while maintaining them in parallelism and for simultaneously changing the spacing of the two series of jet devices so as to adapt the said rails, chains and jet devices for articles of different sizes.

6. The combination of a plurality of pairs of transversely spaced brackets, two parallel rails carried by the brackets of the respective pairs and constituting a track for supporting a series of articles to be treated, two endless chains carried by the brackets of the respective pairs and having portions movable in paths parallel to and adjacent the said rails and provided with projections thereon adapted to engage the said articles to move them along the rails, two longitudinal series of devices carried by the brackets of the respective pairs and positioned adjacent the respective rails for directing jets of fluid against the articles as they are moved, and means for simultaneously and uniformly changing the spacing of the brackets of the respective pairs so as to adapt the said rails, chains and jet devices for articles of different sizes.

7. The combination of a track for supporting a series of articles having their ends projecting beyond the track, means adapted to engage the said articles to move them along the track, and two heating devices adjacent the said track for heating the projecting end portions of the articles.

8. The combination of a track for supporting a series of articles having their ends projecting beyond the track, an endless chain moving in a path parallel to and adjacent the said track and provided with projections thereon adapted to engage the said articles to move them along the track, and two heating devices adjacent the said track for heating the projecting end portions of the articles in order to effect annealing thereof.

9. The combination of two parallel spaced angle bar rails each having its two legs respectively positioned vertically and horizontally with the vertical leg projecting upward from the horizontal leg so that the top edges of the two vertical legs may support a series of transversely extending cylindrical articles having their ends projecting beyond the rails, the two rails being so positioned that the two horizontal legs extend toward each other, two endless chains having portions thereof supported by the said horizontal legs of the rails between the said vertical legs and below the level of the said top edges of the vertical legs, spaced projections on the chain adapted to engage articles supported as aforesaid to move them along the rails, and two heating devices adjacent the said rails for heating the projecting end portions of the said articles, the said heating devices being separated from the chains by the vertical legs of the respective rails.

10. The combination of a track for supporting a series of substantially parallel cylindrical articles having their axes positioned transversely of the track and having their ends projecting beyond the track, an endless chain moving in a path parallel to and adjacent the said track and spaced from the transversely positioned cylindrical articles on the track, the said chain being provided with spaced projections thereon adapted to engage the said articles to maintain them in spaced relationship and to roll them along the track, and two heating devices adjacent the said track for heating the projecting end portions of the said rolling articles in order to effect annealing thereof.

11. The combination of means for moving a series of substantially parallel open-ended articles along a predetermined path extending in a direction transverse of the axes of the articles, two fuel burning devices at opposite sides of the path and respectively below the opposite ends of the articles, and two longitudinally extending transversely inclined baffle plates adjacent the ends of the moving articles and adapted to direct flame and hot gases into the interiors of the articles.

12. The combination of a track for supporting a series of substantially parallelly cylindrical articles having their axes positioned transversely of the track, an endless chain moving in a path parallel to and adjacent the said track and spaced from the transversely positioned cylindrical articles, the said chain being provided with spaced projections thereon adapted to engage the said tubular articles to maintain them in spaced relationship and to roll them along the track, two fuel burning devices at opposite sides of the track and respectively below the opposite ends of the articles, and two longitudinally extending transversely inclined baffle plates adjacent the ends of the moving articles and adapted to direct flame and hot gases into the interiors of the articles.

13. The combination of means for moving along a predetermined path a series of articles to be treated, two heating devices at opposite sides of the said path for heating the laterally projecting portions of the articles, and means for changing the spacing of the heating devices with respect to each other and with respect to the said path so as to adapt them for articles of different sizes.

14. The combination of means for moving along a predetermined path a series of articles to be treated, two heating devices at opposite sides of the said path for heating the laterally projecting portions of the articles, and means for moving the two heating devices uniformly in opposite directions so as to adapt them for acting upon articles of different sizes and so as to nevertheless maintain the said devices in symmetrical relationship to a fixed central plane.

15. The combination of two parallel rails constituting a track for supporting a series of articles to be treated, an endless chain moving in a path parallel to and adjacent the said track and provided with projections thereon adapted to engage the said articles to move them along the track, two heating devices adjacent the said rails for heating the laterally projecting portions of the articles, and means for changing the spacing of the rails while maintaining them in parallelism and for simultaneously changing the spacing of the heating devices so as to adapt the said rails and heating devices for articles of different sizes.

16. The combination of two parallel rails constituting a track for supporting a series of articles to be treated, an endless chain moving in a path parallel to and adjacent the said track and provided with projections thereon adapted to engage the said articles to move them along the track, two heating devices adjacent the said rails for heating the laterally projecting portions of the articles, and means for moving the two rails and the two heating devices uniformly in opposite directions so as to adapt the said rails and heating devices for articles of different sizes and so as to nevertheless maintain the said rails and heating devices in symmetrical relationship to a fixed central plane.

17. The combination of two parallel rails constituting a track for supporting a series of articles to be treated, two endless chains moving in paths parallel to and adjacent the said track and provided with projections thereon adapted to engage the said articles to move them along the track, two heating devices adjacent the said rails for heating the projecting portions of the articles, and means for changing the spacing of the rails and of the chains while maintaining them in parallelism and for simultaneously changing the spacing of the heating devices so as to adapt the said rails, chains and heating devices for articles of different sizes.

18. The combination of a plurality of pairs of transversely spaced brackets, two parallel rails carried by the brackets of the respective pairs and constituting a track for supporting a series of articles to be treated, two endless chains carried by the brackets of the respective pairs and having portions movable in paths parallel to and adjacent the said rails and provided with projections thereon adapted to engage the said articles to move them along the rails, two longitudinal series of heating devices carried by the brackets of the respective pairs and positioned adjacent the respective rails, and means for simultaneously and uniformly moving the two brackets of the respective pairs in opposite directions so as to adapt the said rails, chains and heating devices for articles of different sizes and so as to nevertheless maintain the said rails, chains and heating devices in symmetrical relationship to a fixed central plane.

19. In a machine of the class described, the combination of a track for guiding a series of similar articles for movement along a predetermined continuous path, an endless chain moving in a path parallel to and adjacent the said track throughout the entire length thereof, the said chain being provided with projections thereon adapted to engage the said articles to move them along the track, means adjacent one part of the said track for directing cleaning liquid against the said moving articles, and means adjacent a succeeding part of the said track for heating portions of the said moving articles to effect the annealing thereof.

20. The combination of a track for supporting a series of substantially parallel cylindrical articles having their axes positioned transversely of the track, an endless chain moving in a path parallel to and adjacent the said track and provided with spaced projections thereon adapted to engage the said tubular articles to maintain them in spaced relationship and to roll them along the track, means adjacent one part of the said track for directing cleaning liquid against the said moving articles, and means adjacent a succeeding part of the said track for heating portions of the said moving articles to effect the annealing thereof.

GEORGE WEBB.